United States Patent [19]

Blyler, Jr.

[11] Patent Number: 4,691,989
[45] Date of Patent: Sep. 8, 1987

[54] OPTICAL FIBER CABLE

[75] Inventor: Lee L. Blyler, Jr., Basking Ridge, N.J.

[73] Assignee: American Telephone and Telegraph Company, AT&T Bell Laboratories, Murray Hill, N.J.

[21] Appl. No.: 880,959

[22] Filed: Jun. 27, 1986

Related U.S. Application Data

[63] Continuation of Ser. No. 528,529, Sep. 1, 1983, abandoned.

[51] Int. Cl.4 .................................................. G02B 6/44
[52] U.S. Cl. .............................. 350/96.23; 350/96.34
[58] Field of Search ............... 350/96.23, 96.29, 96.30, 350/96.33, 96.34; 174/70 R

[56] References Cited

U.S. PATENT DOCUMENTS

| 4,105,284 | 8/1978 | Olshansky | 350/96.33 |
| 4,114,981 | 9/1978 | Ishida et al. | 350/96.33 |
| 4,147,407 | 4/1979 | Eichenbaum et al. | 350/96.34 |
| 4,156,104 | 5/1979 | Mondello | 174/70 R |
| 4,472,019 | 9/1984 | Bishop et al. | 350/96.30 |

FOREIGN PATENT DOCUMENTS

| 2924495 | 1/1981 | Fed. Rep. of Germany | 350/96.23 |
| 2060929 | 5/1981 | United Kingdom | 350/96.23 |

*Primary Examiner*—John Lee
*Attorney, Agent, or Firm*—Bruce S. Schneider

[57] ABSTRACT

It has been found that cables with encapsulated optical fibers incur unexpected losses in an optical communication system. These losses are substantially reduced by employing an elastomeric encapsulant that has an elastic modulus of at least 300 psi and that is capable of being removed without substantially affecting the fiber.

11 Claims, 2 Drawing Figures

OPTICAL FIBER CABLE

This application is a continuation of application Ser. No. 528,529, filed Sept. 1, 1983 (now abandoned).

BACKGROUND OF THE INVENTION

1. Field of the Invention

This invention relates to cable and, in particular, to optical fiber cable.

2. Art Background

Optical fiber, as used in optical communication systems, is generally incorporated into a multifiber cable. Numerous multifiber cable configurations have been developed and each has been specifically designed to satisfy the requirements imposed by a particular application. Recent requirements have led to the encapsulation of the fibers within the cable, i.e., the fibers are enclosed by an elastomeric material. The encapsulation of the fibers is particularly advantageous in uses where the cable contacts liquids such as water. For example, undersea cables that include a self-supporting, load bearing wire cage, e.g., a steel wire cage, surrounding coated fibers that are encapsulated in an elastomer and an outer sheath, e.g., a nylon sheath, employ this encapsulated design. (See U.S. Pat. No. 4,156,104 issued May 22, 1979 which is hereby incorporated by reference.) If encapsulation is not utilized and the cable is ruptured, e.g., by fishing trawlers, or during recovery operations, water could enter the cable along the coated fibers and follow these fibers to electronic equipment, e.g., repeaters, spaced periodically along the transmission line. Water entering electronic equipment results in serious damage necessitating costly repairs and replacement. Additionally, the introduction of water into the cable increases the possibility of excess transmission losses. Thus, encapsulation to prevent water encroachment is certainly desirable.

The desire to exclude the presence of water is also strong for terrestrial applications. For example, in most environments, buried cables will encounter substantial water contact. Water reaching the fiber upon freezing and thawing can cause significant bending stresses that, in turn, induce fiber damage or unacceptable transmission losses.

A wide variety of encapsulants have been contemplated for encapsulated or filled cables. The use of liquid or gelled encapsulants such as an oil-extended styrene/ethylene-butene/styrene block copolymer has been suggested. (See, for example, *The Proceedings of the Thirty-First Wire and Cable Symposium,* U.S. Army Communications-Electronics Command (CECOM), Fort Monmouth, N.J., 1982, pp. 396–400.) In contrast, the use of substantially elastomeric materials to additionally limit microbending losses has also been suggested in U.S. Pat. No. 4,156,104 issued May 22, 1979 where it is indicated that HYTREL (HYTREL is a registered trademark of E. I. DuPont deNemours and Co., Inc.) polyester elastomers are employable. (Several HYTREL ® polymers are available from E. I. duPont de Nemours & Company.) Although present cables show advantageous properties, it is certainly desirable to improve the transmission losses encountered through improvement to these structures.

SUMMARY OF THE INVENTION

Two previously undisclosed effects have been found to significantly affect fiber performance in encapsulated cables. The first effect relates to the elasticity of the encapsulating material. In particular, if an encapsulant having an elastic modulus of less than 300 psi is employed, significant kinking of the encapsulated fiber during cable bending occurs. Secondly, it is quite important to remove expeditiously the elastomer from the fiber, e.g., coated fiber, without substantially affecting the fiber, and in particular, the fiber coating. Removal of the encapsulant by, for example, the use of a solvent or by melting is required to allow splicing of fibers at cable joints or for producing other transmission connections. It has been found that if the encapsulant is not easily removed, substantial degradation of the fiber properties occurs.

DETAILED DESCRIPTION

Figure 1:
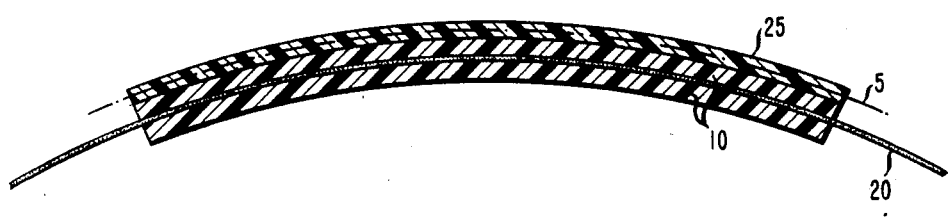
FIG. 1 is illustrative of samples suitable for demonstrating the invention.

The cables of the invention are all of the encapsulated fiber type. That is, the cable includes a single or a plurality of fibers at least one of which (1) is contacted and surrounded by an elastomeric material—a material having a modulus of less than 50,000 psi and which behaves in a substantially elastic manner in that an applied deformation is essentially fully recoverable upon the release of stress (as described in F. W. Billmeyer, Jr., *Textbook of Polymer Science,* 2d ed., Wiley-Intersciences, New York, 1971, page 191) when subjected to stress—and (2) does not, through its entire length, lie along the neutral axis of the cable for a distance greater than 10 meters. (See S. Timoshenko and G. H. MacCullough, *Elements of Strength of Materials,* D. VanNostrand Co., Princeton, N.J., 1949, for the definition of neutral axis, i.e., the axis along which compressive and tensile strains are equal to zero when the cable is bent.) These cables are constructed in a variety of ways. For example, a central core including a strength member, i.e., a steel wire, is surrounded by a layer of an elastomer utilizing conventional techniques. (Structural members are desirable but not critical. However, these members are advantageously employed for applications in which the fibers are continuously encapsulated by melt extrusion or die coating.) Fibers are positioned around this member and are encapsulated also by conventional techniques such as melt extrusion. An outer sheath is then provided by well-known methods such as melt extrusion.

Significantly, the applicant has realized that the elastomeric material should have certain properties to achieve the best transmission and mechanical properties for the cable as installed in a communication system. In particular, the elastomer should have an elastic modulus (as defined in S. Timoshenko and G. H. MacCullough, *Elements of Strength of Materials,* D. VanNostrand Co., Princeton, N.J., 1949) of at least 300 psi, preferably at least 500 psi. It has been found that the use of an elastomer with a lower modulus results in buckling of the fiber upon introduction of compressive stress induced by the bending of the cable body. A variety of compounds that satisfy this minimum modulus criterion are available. For example, HYTREL ®4056, KRATON D3204, (KRATON is a registered trademark of Shell Chemical Co.), KRATON ®G7720 and ESTANE 58881 (ESTANE is a registered trademark of B. F. Goodrich Co.) that are elastomers composed, respectively, of a poly(butylene terephthalate)-co-poly(tetramethyleneoxy terephthalate copolymer, a styrene/butadiene/styrene block copolymer, a styrene/ethylene-butene/styrene block copolymer and a segmented polyurethane polymer having elastic moduli, respectively, of 7500, 2400, 900 and 2900 psi are appropriate. The encapsulant elastomer need not include only a single elastomer. Blends of elastomers are also satisfactory as is the use of different elastomers in different portions of the cable. In the case of blends, the blend should have a modulus greater than 300 psi. Where different regions have different elastomers, i.e., where a composite elastomer structure is employed, the minimum modulus of any elastomer contacting and supporting the fiber over a length greater than 10 meters should be at least 300 psi.

The elastomer should have properties that allows its expeditious removal from the fiber (including the fiber coating, if present). As previously discussed, the elastomer is primarily removed from the coated fibers where cable joining or where termination of fiber transmission path is to be accomplished. (In the context of this invention, the fiber coating is defined as the layer or layers of material(s) applied individually to fiber at the time of manufacture and which protect the fiber from abrasion, hostile environments and/or excessive transmission losses due to applied stresses.) Two expeditious techniques are generally available to perform the desired elastomer removal. In a first technique a solvent is utilized which dissolves the elastomer. A second method of removing the elastomer is by melting. (For thermosetting elastomers mechanical removal, such as by mechanical stripping, is also possible.) To avoid fiber property degradation resulting from damage to its coating upon elastomer removal by one of these techniques, the elastomer should be either soluble in non-reactive solvents, i.e., sufficiently weak reactants so that the coating does not undergo extensive chain scission through processes such as oxidation or transesterification, or should melt at relatively low temperatures, i.e., temperatures below 190 degrees C. For typically crystalline elastomeric compositions, e.g., polyester elastomers, the greater the crystallinity the higher the melting point and the lower the solubility in non-reactive solvents. One measure of crystallinity for such materials is the elastic modulus. It has been found that crystalline elastomers such as HYTREL ® elastomers having a modulus less than 10,000 psi correspond to a degree of crystallinity that produces elastomer removal without adversely affecting the fiber coating and thus avoids concomitant adverse effects. In thermoplastic elastomers having a glassy rather than crystalline phase, the elastic modulus does not correlate with softening temperatures or solvent effect. However, the criterion that the elastomer melt at a relatively low temperature or be soluble in a material that is not a strong reactant is still the controlling factor. (In one embodiment for removal of thermosetting materials, e.g., silicones, the elastomer utilized should fail, i.e., tear or rupture, at stress levels well below those which would cause the fiber or its coating to be damaged.)

In a typical example where a UV-cured epoxyacrylate or a UV-cured poly(urethane acrylate) is employed as a fiber coating and where HYTREL ®4056 is employed as an elastomer, the elastomeric material is removed through the utilization of methylene chloride solvent or by heating the elastomer to a temperature of 175 degrees C. Polymer melting points are easily determined by differential scanning calorimetry. If the fiber is coated, an elastomer should be employed that has a softening temperature at least 20 degrees C lower than the temperature at which significant degradation of the fiber's polymer coating occurs on a time scale equivalent to the elastomer removal process. Exemplary of suitable elastomers are HYTREL ®4056, KRATON ®D3204, KRATON ®G7720 and ESTANE ®58881.

The following examples are illustrative of the subject invention.

EXAMPLE 1

As an indication of the buckling phenomenon present in encapsulated cables, samples including a fiber, an elastomer and a high modulus substrate were fabricated and stressed to simulate the conditions experienced in a cable. These samples were produced by molding in a heated platen press. The platens were heated to a temperature of approximately 165 degrees C. A picture frame mold having a thickness of approximately 0.041 cm and an opening of approximately 15.2 by 7.6 cm was utilized. Samples for each elastomer listed in Table I were prepared. Pellets of the chosen elastomer were placed in the picture frame mold which, in turn, was positioned on the platens of the molding machine. The molding was accomplished utilizing a pressure of approximately 70 psi to form an elastomer plaque having the dimensions of the picture frame. In this manner, several plaques of each elastomer were produced.

A picture frame mold, 0.082 cm in thickness, having the same opening size as used in the previous step was employed to mold the elastomer around a fiber. The picture frame mold was placed onto the platen, a plaque was placed in the opening, a coated fiber measuring 260 μm in diameter was placed on the plaque, and a second elastomer plaque of the same dimension was placed over the fiber. (The fiber had a UV-cured epoxy acrylate coating 68 μm in thickness that contained a red dye incorporated to enhance observation during subsequent tests.) The entire package was compression molded at a pressure of approximately 70 psi to form an encapsulated fiber. (The fiber ends during this molding process were led out of the molding frame through grooves and thus extended from the encapsulated package.)

The encapsulated package still in the picture frame mold was placed onto a 10 mil thick MYLAR (MYLAR is a registered trademark of E. I. DuPont deNemours and Co., Inc.) poly(ethylene-terephthalate) film that was, in turn, placed on the platen. The molding process was repeated with a pressure of 70 psi to produce a layered structure shown in the Figure with the MYLAR ®, 25, molded to the encapsulated fiber package including the fiber, 20, and the elastomer, 10.

Figure 2:
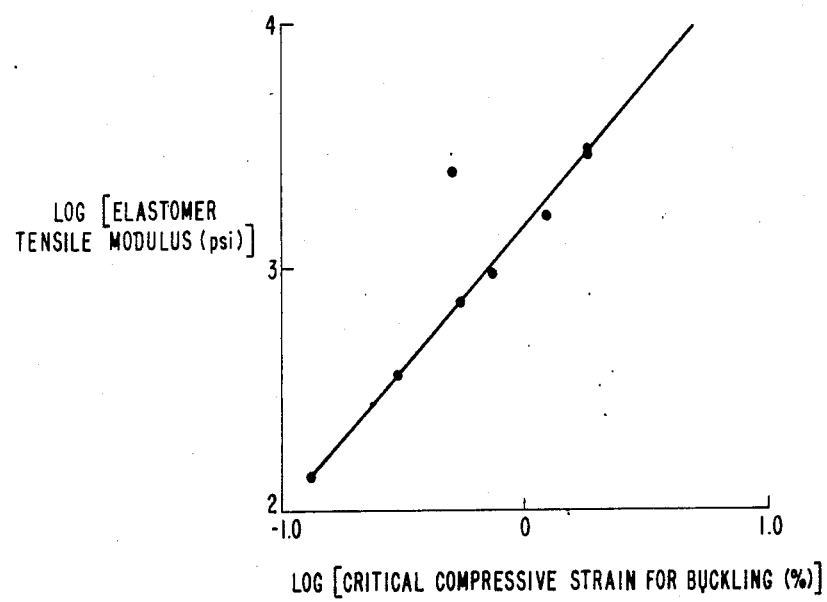
FIG. 2 is illustrative of properties relating to the invention.

A series of stainless steel forms were utilized that had different radii of curvature ranging from 7.5 cm to 70 cm in steps of approximately 10 cm. Each sample was placed on a form and by applying a force induced to conform to the form in a configuration that produced compression on the fiber. The fiber was then visually observed and the configuration—curvilinear or sinusoidal—of the fiber was observed. The compressive strain induced in this manner was calculated from the employed radius of curvature using the formula found in S. Timoshenko and G. H. MacCullough, *Elements of Strength of Materials*, D. VanNostrand Co., Princeton, N.J., 1949, page 120. (The neutral plane of bending in the sandwich does not occur through the fiber since the sandwich is asymmetrical, i.e., it has the poly(ethyleneterephthalate) substrate only on one side. However, the neutral plane, 5, does remain very near the midpoint of the substrate thickness since its modulus is more than 10 times larger than that of the elastomer.) The test was performed for each sample on each stainless steel form. A graph indicating the modulus of each elastomer and the point at which sinusoidal behavior was observed is shown in FIG. 2 and in Table I.

EXAMPLE 2

The core of the cable described in U.S. Pat. No. 4,156,104 issued May 22, 1979 was fabricated in accordance with the description of that patent. The core included a steel central member, an elastomer, and a plurality of fibers arranged as shown in FIG. 2 of that patent where the fibers followed a helical longitudinal path through the core. This core was then wrapped around a reel that had a diameter of approximately 6 feet. Light from a helium-neon laser (wavelength of 6328 Å) was injected into one multimode fiber of the core. The portion of the injected light that was scattered from the fiber rendered the fiber clearly visible through the length of core. Two different elastomers were observed using this procedure—HYTREL ®4056 having a modulus of 7500 psi and KRATON ®G2706 having a modulus of 130 psi. The former exhibited no distortion from its helical path while the use of the latter elastomer produced a fiber which was distorted from its path on the side of the core that was in compression.

EXAMPLE 3

Three cores as described in Example 2 were produced. Each core utilized one elastomer listed in Table II. This core was then immersed in the corresponding solvent listed in Table II. The core was maintained in the solvent until the elastomer dissolved. The remaining portion of the core was extracted from the solvent. In the methylene chloride case the fiber coating initially swelled but upon evaporation of the solvent returned to its original condition.

For HYTREL ®4056 (modulus of 7500 psi) the elastomer coating was also removed by directing a stream of hot air at a temperature of approximately 170 degrees C. over the portion of the elastomer that was to be removed. After approximately 10 seconds, a die having an opening equivalent to the diameter of the fiber (including the coating) was slipped along each fiber to remove the molten elastomer. The resulting freed fiber had a coating that remained substantially unaffected by the procedure.

It should be noted that materials such as HYTREL ®5556, 6346 and 7246 (modulus of 30,000, 50,000 and 75,000 psi, respectively) when immersed in solvents such as those listed in Table I are not dissolved. To dissolve such elastomers solvents such as trifluoroacetic acid and perfluoroisopropanol are required. These solvents, or solvents having equivalent dissolution strengths, also degrade the properties of fibers coated with materials such as epoxy acrylates and urethane acrylates.

TABLE I

Properties of Elastomers Used in Embedded Core Optical Cables

| Elastomer | Type | Tensile Modulus at 1% Strain (psi) | Critical Compressive Strain for Buckling (%) | Solvent |
|---|---|---|---|---|
| KRATON ® G2706 | SEBS | 140 | 0.13 | cyclohexane |
| 50% KRATON ® G2706-50% KRATON ® G2705 | SEBS | 290 | 0.36 | cyclohexane |
| KRATON ® G2705 | SEBS | 720 | 0.53 | cyclohexane |
| KRATON ® G7720 | SEBS | 930 | 0.71 | cyclohexane |
| ESTANE ® 58881 | SPU | 1600 | 1.20 | methylene chloride |
| KRATON ® D3204 | SBS | 2400 | 0.59 | cyclohexane |
| ESTANE ® 58887 | SPU | 2900 | 1.8 | methylene chloride |
| ESTANE ® 58810 | SPU | 3000 | 1.8 | methylene chloride |
| HYTREL ® 4056 | PE | 7500 | >2.1 | methylene chloride |

SEBS - styrene/ethylene-butene/styrene block copolymer
SPU - segmented polyurethane
SBS - styrene/butadiene/styrene block copolymer
PE - poly(butylene terephthalate)-co-poly(tetramethyleneoxy)terephthalate

TABLE II

| Elastomers Used In Cable Core Fabrication | |
|---|---|
| Elastomer | Solvent |
| HYTREL ® 4056 | methylene chloride |
| KRATON ® D3204 | cyclohexane |
| HYTREL ® 4056/ KRATON ® D3204 composite | cyclohexane |

What is claimed is:

1. A cable containing (1) at least one coated optical fiber that for a distance of at least 10 meters lies other than along the neutral axis of said cable, (2) at least one member disposed in the axial direction of said cable and (3) an elastomeric composition in addition to said coated fiber that contacts and surrounds said coated fiber and said member characterized in that said elastomeric composition has an average elastic modulus greater than 300 psi and said elastomeric composition is capable of being removed without substantially affecting said coating of said fiber.

2. The cable of claim 1 wherein said elastomer satisfies at least one removal criterion and wherein said removal criteria are that (1) said elastomer is dissolvable in a non-reactive solvent, and (2) said elastomer melts at a temperature below 190 degrees C.

3. The cable of claim 1 wherein said elastic modulus is at least 500 psi.

4. The cable of claim 1 wherein said coating comprises a UV-cured epoxy acrylate or a urethane acrylate.

5. The cable of claim 1 including a sheathing surrounding said elastomer.

6. The cable of claim 5 wherein said sheathing comprises a nylon.

7. The cable of claim 1 including a plurality of optical fibers.

8. The cable of claim 1 wherein said elastomer is capable of being removed with a solvent.

9. The cable of claim 1 wherein said elastomer is capable of being removed by melting.

10. The cable of claim 1 wherein said member comprises a structural member.

11. The cable of claim 1 wherein said member comprises a coated optical fiber.

* * * * *